United States Patent
Perkins et al.

(10) Patent No.: US 8,903,416 B1
(45) Date of Patent: *Dec. 2, 2014

(54) WIRELESS TRACKING SYSTEM AND METHOD UTILIZING NEAR-FIELD COMMUNICATION DEVICES

(75) Inventors: Matthew R. Perkins, San Diego, CA (US); Anthony Truscott, San Diego, CA (US)

(73) Assignee: Awarepoint Corporation, San Diego, CA (US)

( * ) Notice: Subject to any disclaimer, the term of this patent is extended or adjusted under 35 U.S.C. 154(b) by 290 days.

This patent is subject to a terminal disclaimer.

(21) Appl. No.: 13/400,090

(22) Filed: Feb. 19, 2012

Related U.S. Application Data

(63) Continuation-in-part of application No. 13/029,107, filed on Feb. 16, 2011, now abandoned, and a continuation-in-part of application No. 12/885,509, filed on Sep. 18, 2010.

(60) Provisional application No. 61/445,025, filed on Feb. 21, 2011, provisional application No. 61/305,146, filed on Feb. 17, 2010, provisional application No. 61/244,053, filed on Sep. 20, 2009.

(51) Int. Cl.
 *H04W 24/00* (2009.01)
(52) U.S. Cl.
 USPC .............. 455/456.1; 455/41.2; 455/556.1; 340/572.1; 340/573.1
(58) Field of Classification Search
 CPC ........ B08B 3/00; B08B 3/04; G08B 13/1436; G08B 21/22; H04B 5/00; H04W 12/00
 USPC .......... 455/41.1, 41.2, 41.3, 556.1, 557, 500, 455/456.1, 456.2, 456.3; 340/572.1, 573.1
 See application file for complete search history.

(56) References Cited

U.S. PATENT DOCUMENTS

| | | | |
|---|---|---|---|
| 5,732,401 | A | 3/1998 | Conway |
| 5,812,865 | A | 9/1998 | Theimer et al. |
| 5,977,913 | A | 11/1999 | Christ |
| 7,123,149 | B2 | 10/2006 | Nowak et al. |
| 7,197,326 | B2 | 3/2007 | Acampora |
| 7,312,752 | B2 | 12/2007 | Smith et al. |
| 7,324,824 | B2 | 1/2008 | Smith et al. |
| 7,336,182 | B1 | 2/2008 | Baranowski et al. |
| 7,471,200 | B2 | 12/2008 | Otranen |
| 7,573,382 | B2 | 8/2009 | Choubey et al. |

(Continued)

FOREIGN PATENT DOCUMENTS

| | | |
|---|---|---|
| WO | WO2009045085 | 4/2009 |
| WO | WO2009066951 | 5/2009 |

OTHER PUBLICATIONS

International Search Report and Written Opinion for PCT Application No. PCT/US2010/049413.

*Primary Examiner* — Ping Hsieh
(74) *Attorney, Agent, or Firm* — Clause Eight IPS; Michael Catania

(57) ABSTRACT

The present invention provides a solution to determining a near-field communication interaction in a wireless tracking mesh network. The present invention utilizes near-field communication devices in conjunction with tracking tags to transmit signals for reception by sensors stationed throughout a facility which form a mesh network and forward the signals to an information engine for analysis.

8 Claims, 11 Drawing Sheets

(56) References Cited

U.S. PATENT DOCUMENTS

| | | | |
|---|---|---|---|
| 7,688,196 B2 * | 3/2010 | Hannah | 340/539.1 |
| 7,868,738 B2 | 1/2011 | Dasgupta et al. | |
| 7,941,096 B2 * | 5/2011 | Perkins et al. | 455/41.2 |
| 8,285,564 B2 * | 10/2012 | Perkins | 705/3 |
| 8,368,540 B2 * | 2/2013 | Perkins et al. | 340/572.1 |
| 2005/0021369 A1 | 1/2005 | Cohen et al. | |
| 2006/0055552 A1 | 3/2006 | Chung et al. | |
| 2006/0056363 A1 | 3/2006 | Ratiu et al. | |
| 2008/0012767 A1 | 1/2008 | Caliri et al. | |
| 2008/0068267 A1 | 3/2008 | Huseth et al. | |
| 2008/0081608 A1 | 4/2008 | Findikli et al. | |
| 2008/0100441 A1 * | 5/2008 | Prodanovich et al. | 340/572.1 |
| 2008/0133127 A1 | 6/2008 | Havens | |
| 2008/0189170 A1 | 8/2008 | Ramachandra | |
| 2008/0233925 A1 * | 9/2008 | Sun et al. | 455/414.1 |
| 2009/0069642 A1 | 3/2009 | Gao et al. | |
| 2009/0081951 A1 | 3/2009 | Erdmann et al. | |
| 2009/0195385 A1 * | 8/2009 | Huang et al. | 340/572.1 |
| 2009/0224868 A1 | 9/2009 | Liu et al. | |

* cited by examiner

US 8,903,416 B1

WIRELESS TRACKING SYSTEM AND METHOD UTILIZING NEAR-FIELD COMMUNICATION DEVICES

CROSS REFERENCES TO RELATED APPLICATIONS

The present application claims priority to U.S. Provisional Patent Application No. 61/445,025, filed on Feb. 21, 2011, and is a continuation-in-part application to U.S. patent application Ser. No. 13/029,107, filed on Feb. 16, 2011, which claims priority to U.S. Provisional Patent Application No. 61/305,146, filed on Feb. 17, 2010, and is a continuation-in-part application to U.S. patent application Ser. No. 12/885,509, filed on Sep. 18, 2010, which claims priority to U.S. Provisional Patent Application No. 61/244,053, filed Sep. 20, 2009, all of which are hereby incorporated by reference in their entireties.

STATEMENT REGARDING FEDERALLY SPONSORED RESEARCH OR DEVELOPMENT

Not Applicable

BACKGROUND OF THE INVENTION

1. Field of the Invention

The present invention is related to wireless tracking systems and methods utilizing near-field communication devices. More specifically, the present invention relates to a system and method utilizing near-field communication devices for analyzing near-field communication interactions.

2. Description of the Related Art

Real-time knowledge of resources, whether the resources are assets or people, is becoming a necessary tool of many businesses. Real-time knowledge of the location, status and movement of crucial resources can allow a business to operate more efficiently and with fewer errors. However, many businesses employ hundreds if not thousands of resources in a single facility, and these resources need to be accounted for by a central system that is user friendly.

For example, in a typical hospital there are numerous shifts of employees that utilize the same equipment. When a new shift arrives, the ability to quickly locate medical equipment not only results in a more efficient use of resources, but also can result in averting a medical emergency. Thus, the tracking of medical equipment in a hospital is becoming a standard practice.

The tracking of objects in other facilities is rapidly becoming a means of achieving greater efficiency. A typical radio frequency identification system includes at least multiple tagged objects, each of which transmits a signal, multiple receivers for receiving the transmissions from the tagged objects, and a processing means for analyzing the transmissions to determine the locations of the tagged objects within a predetermined environment.

The prior art discloses various tracking systems and uses of near-field communication devices. Near field communication typically operates in the 13.56 MHz frequency range, over a distance of one meter or less and usually a few centimeters. Near field communication technology is standardized in ISO 18092, ECMA 340, and ETSI TS 102 190.

One reference discloses an adapter for a tag that is configured to emulate a near filed communication reader-to-reader tag.

Another reference discloses a medical diagnostic system that includes a data acquisition device having a near field communication device for transfer of data.

Another reference discloses using ECMA 340 standard for near field communication.

Another reference discloses a system for monitoring a patient that uses a personal status monitoring device, such as an ECG electrode assembly, which transmits a signal to an intermediary device, such as a PDA, which transmits to a server using a WLAN.

Another reference discloses an object identifier that transmits both an IR signal and a RF signal for location determination.

Another reference discloses a system which allows for a location to be determined without requiring precise calculations through use of an object identifier that transmits one identifier corresponding to an object identifier and a second identifier which is a group identifier.

Another reference discloses a system for recording object associations based on signals for object identifiers.

Another reference discloses a system that uses NFC technology to determine a secondary transport mechanism.

Another reference discloses a system that uses BLUETOOTH technology integrated in a cellular telephone to provide interpersonal communications between individuals.

Another reference discloses near field communication devices that determine an efficient protocol for sharing information.

Another reference discloses passing advertising messages to a mobile client using near field communication technology.

As stated above, the problem is inadequate resource visibility in a business. Businesses such as hospitals, need to locate resources (assets and people), know the status of the resources, and understand the usage history of the resources to enable business improvement.

Specific problems for hospitals include tracking infections in a hospital to determine a source and other areas or individuals that may be infected. Other problems include spotting emerging patterns of infection and outbreaks to mitigate those affected. Further, for MEDICARE and other insurance providers, hospitals and other medical facilities need to demonstrate that patients received their required care in order to receive payment for such care. The prior art has failed to provide an adequate solution to these problems.

Further, there is a need in the health care market to determine when interactions occur between patient worn devices and clinician worn devices. Being able to detect this interaction will drive many applications that revolve around workflow, patient flow and asset tracking. To enable the detection of these interaction events, a communication protocol must be defined such that the tags will recognize when they are in-range of each other and report on the in-range event. Off-the-shelf technologies can be employed for this use case but the battery-life, communication range and data rate requirements are often traded for communication performance. For example, peer-to-peer WiFi could be used to establish a near-real time connection between two devices but the battery life of the WiFi-enabled device would be on the order of 1-2 days which would not support the application need. Many other technologies have the same drawbacks.

To accomplish these applications, one must find a system that doesn't trade battery life for response time, or communication distance for battery life.

BRIEF SUMMARY OF THE INVENTION

The present invention provides a solution in the form of a low-power interaction detection circuit that triggers a higher-power communication system that can transfer more meaningful data after an interaction event has been detected. The solution determines a near-field communication interaction between objects through wireless tracking. The present invention utilizes near-field communication devices attached to objects (including individuals) and the objects also have the capability to transmit signals for reception by sensors stationed throughout a facility which forward the signals to an information engine for analysis of a near-field communication interaction.

One aspect of the present invention is a system for monitoring interaction data for multiple users and objects utilizing near-field communication devices in an indoor facility through a medium range wireless communication format and a short range wireless communication format. The system includes a mesh network, a plurality of near-field communication devices and an information engine. Each of the plurality of near-field communication devices transmits a beacon signal using a short range wireless communication format receivable by another near-field communication device when the near-field communication devices are within physical proximity of each other. At least one of the near-field communication devices transmits interaction data using a medium range wireless communication format to the mesh network. The information engine is in communication with the mesh network and processes the interaction data.

The medium range wireless communication format is preferably selected from ZIGBEE communication format, Bluetooth communication format, Low-Power BlueTooth communication format, WiFi communication format, Low-Power WiFi communication format, Ultra Wide Band communication format, Ultrasound communication format or Infrared communication format. The short range wireless communication format is preferably selected from a near-field communication format, a low frequency communication format or a magnetic field communication format. Alternatively, the short range wireless communication format is selected from a magnetic induction communication format, 9 kHz communication format, <125 kHz communication format, 125 kHz RFID communication format, 13.56 MHz communication format, 433 MHz communication format, 433 MHz RFID communication format, or 900 MHz RFID communication format.

Another aspect of the present invention is a system for determining a business relationship between individuals within a facility. The system includes multiple near-field communication devices, multiple tags, a mesh network and an information engine. The mesh network is preferably an 802.15.4 ZIGBEE wireless sensor network. Each of the first near-field communication devices represented is associated with an individual. Each of the tags represents an object. The mesh network includes multiple plug-in sensors located within the facility. The information engine is in communication with the mesh network. The information engine determines a business relationship between a first bearer and a second bearer having a near-field communication interaction based on at least two of multiple factors which include a position location of the interaction, a duration of the interaction, a previous location of the first bearer, a previous location of the second bearer and the number of other objects located near the near-field communication interaction.

In a preferred embodiment, the plurality of factors further includes a position designation of the first person and a position designation of the second person and a number of previous interactions between the first person and the second person within a predetermined time period.

Another aspect of the present invention is a method for determining a business relationship between individuals within a facility. The method includes transmitting a signal from a tag associated with a first person, and the signal comprises data about a near-field communication interaction between the first person and a second person. The method also includes receiving the signal from the first tag at a mesh network established within the facility. The method also includes determining that an interaction is occurring between the first person and the second person. The method also includes determining a business relationship between the first person and the second person based on multiple factors. The multiple factors can include a position location of the interaction, a duration of the interaction, a previous location of the first person prior to the interaction, a previous location of the second person prior to the interaction, a position designation of the first person and a position designation of the second person, a number of previous interactions between the first person and the second person within a predetermined time period, and the number of other persons at the interaction.

Yet another aspect of the present invention is a system for determining a business relationship between individuals within a facility. The system includes multiple near-field communication devices, multiple tags, a mesh network and an information engine. Each of the near-field communication devices is associated with an individual person. Each of the tags represents a first object. The mesh network includes multiple plug-in sensors located within the facility. The information engine is in communication with the mesh network. The information engine analyzes a near-field communication interaction. The multiple factors for the near field communication interaction include a position location of the interaction, a duration of the interaction, a previous location of the first person prior to the interaction, and information for a mobile object within a predetermined distance of the location of the interaction.

In one example, the information engine analyzes the near-field communication interaction to determine a billing charge for services of the first person. In another example, the facility is a hospital and the information engine analyzes the near-field communication interaction to determine medical services provided to a patient.

Yet another aspect of the present invention is a system for analyzing an action of an individual. The system includes near-field communication devices, tags, a mesh network and an information engine. Each of the near-field communication devices is associated with an individual person. Each of the tags is associated with a mobile object. The mesh network includes multiple sensors positioned within a facility. The mesh network receives transmissions from each tags and each of the near-field communication devices. The information engine is in communication with the mesh network. The information engine analyzes near-field communication interactions between individuals. The information engine further analyzes an action of a first person based on a plurality of factors including a position location of the action, a duration of the action, a previous location of the first person prior to the action, and information for a mobile object within a predetermined distance of the location of the action.

Each communication device preferably has a low-power, short-range (<1 foot) communication feature that can detect the presence, or absence, of a signal from another device. Short bits of information are preferably exchanged (<256 bits) between devices but such an exchange is not mandatory. RFID systems operating at frequencies of sub-125 kHz, 125 kHz, 433 MHz, 900 MHz, or 2.4 GHz are used with the present invention. The communication devices alternatively transmit at frequencies as low as 5 kiloHertz ("kHz") and as high as 900 MegaHertz ("MHz"). Other frequencies utilized by the tags for a low-power short-range communication system include 9 kHz, <125 kHz, 433 MHz, and 900 MHz.

Each device preferably contains a low-power, medium-range (1 foot to 30 feet) wireless communication system. Such wireless communication systems include ZIGBEE, BLUETOOTH, Low-Power BLUETOOTH, WiFi or Low-Power WiFi, Ultra Wide Band ("UWB"), Ultrasound and Infrared communication systems. The wireless communication system is used to exchange device specific information after the low-power short-range system has indicated that an interaction has occurred. Those skilled in the pertinent art will recognize that the wireless communication system can also be used independent of the low-power short-range system for other wireless communication applications such as location and tracking, sense and control, building automation, smart energy, telecom applications, consumer building automation, remote control applications, home health care, personal fitness, personal wellness, and many other applications.

Each communication device preferably continuously transmits a beacon signal using the short-range communication protocol. When a beacon signal is received by another communication device, the receiving communication device can respond using the low-power communication circuit and/or it can respond using the medium-power protocol. The medium-power communication system can transfer larger data packets at a higher transmission rate. Data that might be included in a medium-power transmission include device ID, time stamp, location information, user information, software version, and/or protocol version. A medium-power transmission is preferably acknowledged when received by the receiving communication device. Further, at this point either communication device, or both communication devices, can transmit the information from the interaction to the medium-power infrastructure or to a neighboring communication device. Additionally, the communication devices may also elect to store the interaction information and download/transmit the interaction information at a later time.

Yet another aspect of the present invention is a system for monitoring hand sterilization. The system includes a mesh network, a plurality of near-field communication devices, a hand sterilization station and an information engine. Each of the plurality of near-field communication devices transmits a beacon signal using a short range wireless communication format receivable by another near-field communication device when the near-field communication devices are within physical proximity of each other. At least one of the near-field communication devices transmits interaction data using a medium range wireless communication format to the mesh network. The hand sterilization station comprises a hand washing facet activated by an infrared sensor and in communication with a near-field communication device. The information engine is in communication with the mesh network and processes the interaction data. A near-field communication interaction is recorded when a bearer of a near field communication device of the plurality of near-field communication devices activates the infrared sensor of the hand washing facet during a hand washing event. The recordation of the near-field communication interaction is transmitted over the mesh network to the information engine for storage.

Yet another aspect of the present invention is a method for monitoring hand sterilization utilizing near-field communications. The method includes sensing for a near-field communication interaction at a hand washing station. The method also includes verifying activation of a infrared sensor for activation of a hand washing facet of the hand washing station. The method also includes verifying a near-field communication interaction with a bearer of a near-field communication device and an activator of the infrared sensor. The method also includes recording data concerning the near-field communication interaction at at least one of an interacting near-field communication device. The method also includes transmitting the data concerning the near-field communication interaction over a mesh network to a processing engine.

Having briefly described the present invention, the above and further objects, features and advantages thereof will be recognized by those skilled in the pertinent art from the following detailed description of the invention when taken in conjunction with the accompanying drawings.

DETAILED DESCRIPTION OF THE INVENTION

Figure 1:
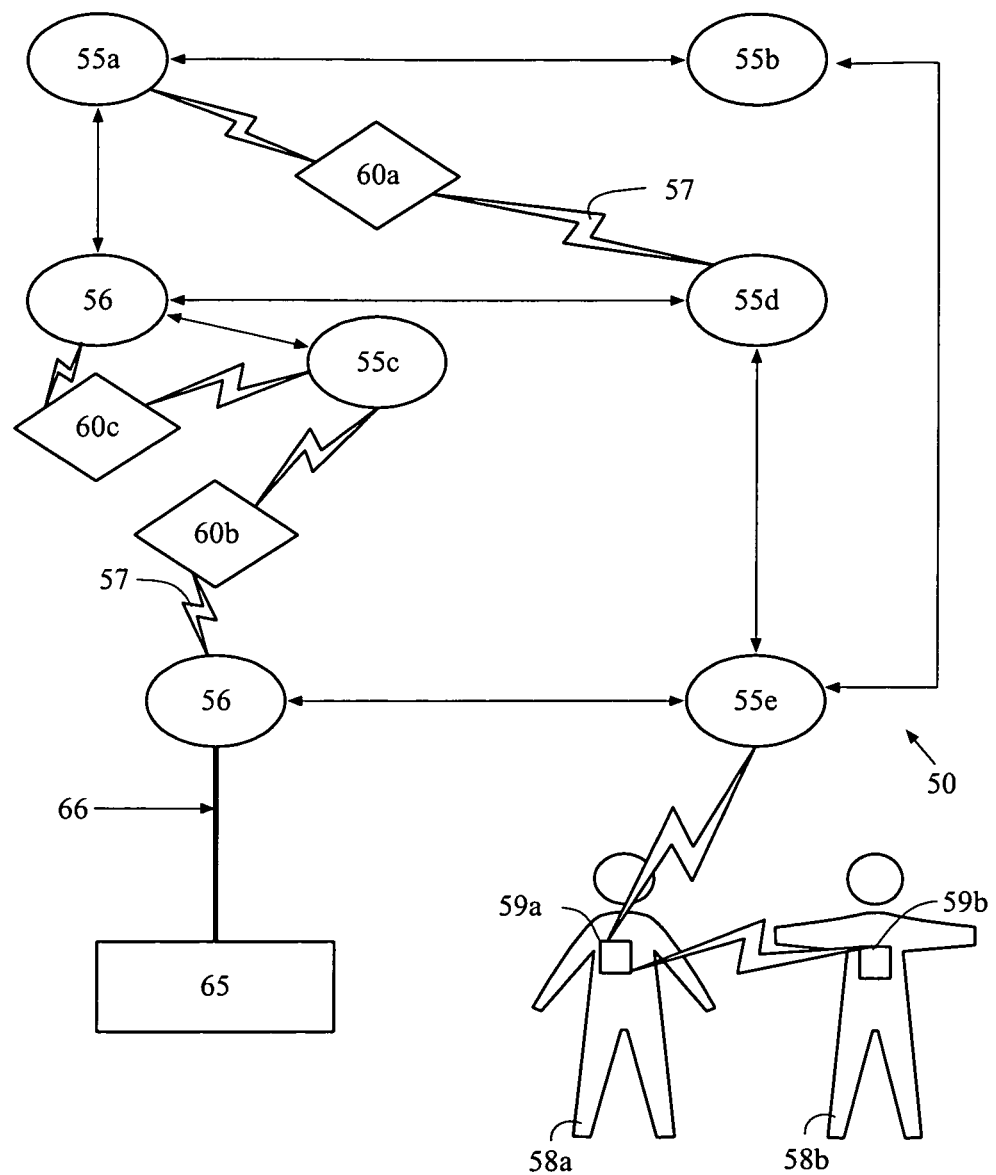
FIG. 1 is schematic view of a system for analyzing a near-field communication interaction.
Figure 2:
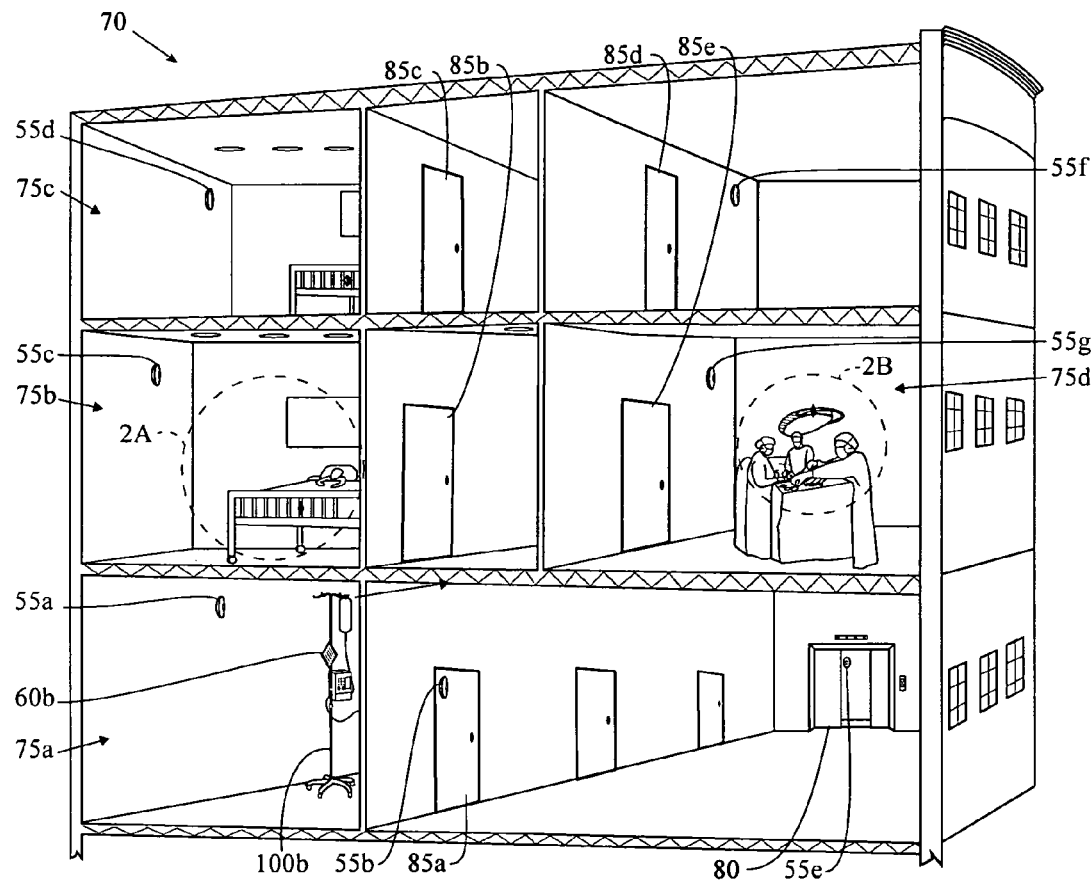
FIG. 2 is a multi-floor view of a facility employing a system for analyzing a near-field communication interaction.
Figure 2A:
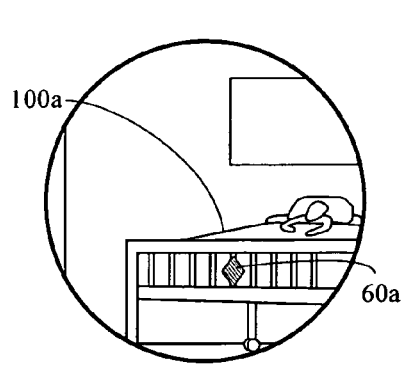
FIG. 2A is an isolated view of circle 2A of FIG. 2.
Figure 2B:
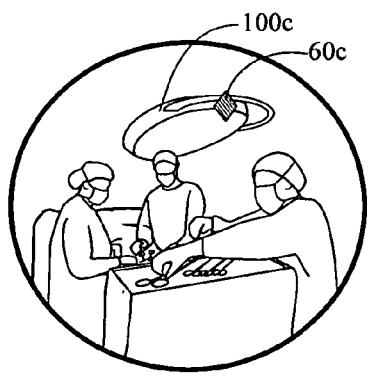
FIG. 2B is an isolated view of circle 2B of FIG. 2.
Figure 3:
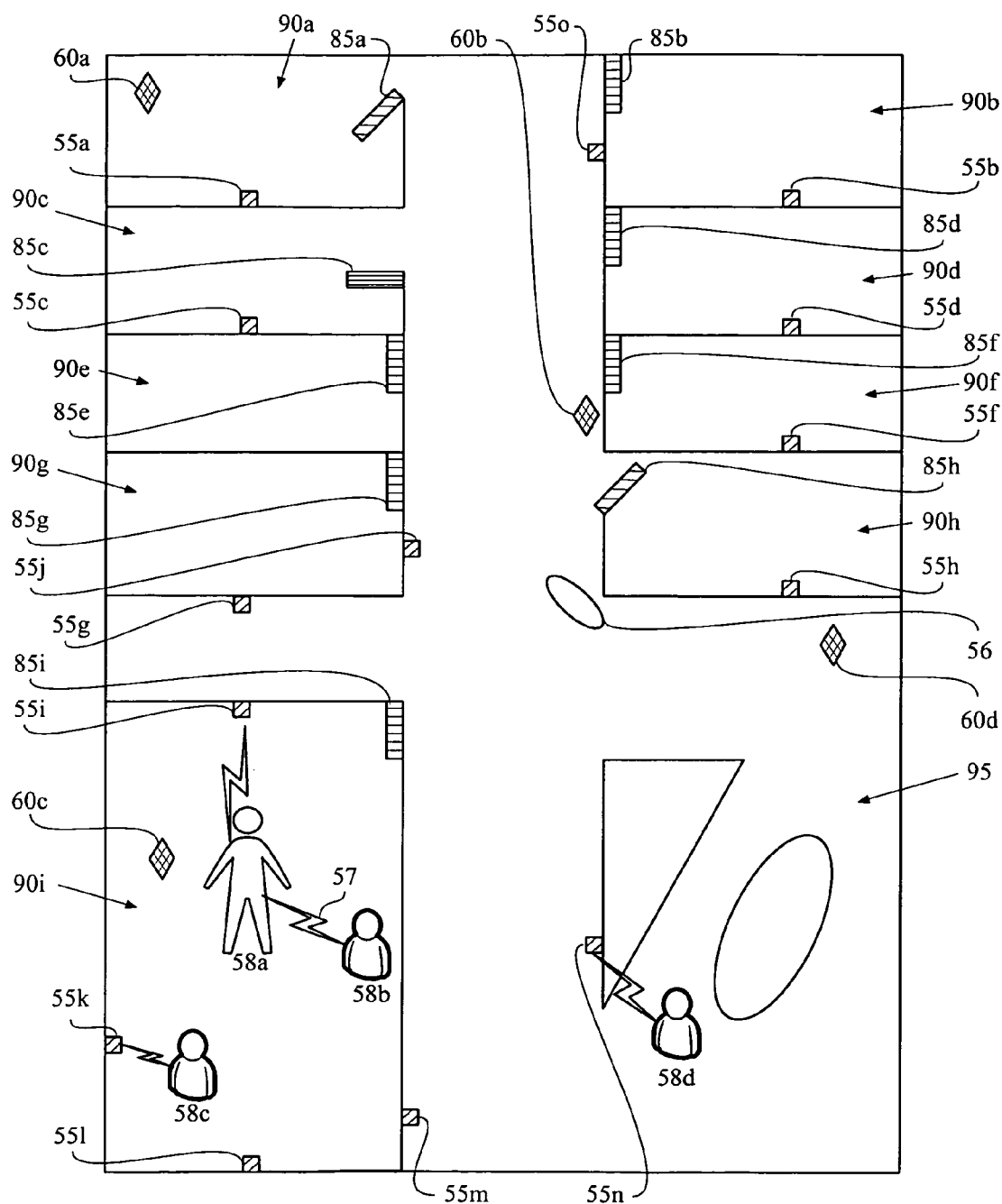
FIG. 3 is a floor plan view of a single floor in a facility employing the system for analyzing a near-field communication interaction.

As shown in FIGS. 1-3, a system for tracking objects within a facility is generally designated 50. The system 50 is capable of analyzing an interaction between objects, individuals 58 and/or objects 100. The system 50 preferably includes a plurality of sensors 55, a plurality of bridges 56, a plurality of near-field communication devices 59, a plurality of tags 60, and at least one information engine 65. The sensors 55 form a mesh network for receiving signals from the near-field communication devices 59 and tags 60. One example of the components of the system 50 is disclosed in U.S. Pat. No. 7,197,326, for a Wireless Position Location And Tracking System, which is hereby incorporated by reference in its entirety. A more specific example of the sensors 55 is disclosed in U.S. Pat. No. 7,324,824, for a Plug-In Network Appliance, which is hereby incorporated by reference in its entirety.

The system 50 is preferably employed at a facility 70 such as a business office, factory, home, hospital and/or government agency building. The system 50 is preferably utilized to track and locate various objects (including persons) positioned throughout the facility 70 in order to analyze near-field communication interactions. The near-field communication devices 59 and tags 60 preferably continuously transmit signals on a predetermined time cycle, and these signals are received by sensors 55 positioned throughout the facility 70. Alternatively, the tags 60 and near-field communication devices 59 transmit signals in a random, ad-hoc or dynamic manner, and these signals are received by the sensors 55 positioned throughout the facility 70. The sensors 55 transmit the data from the near-field communication devices 59 and tags 60 to a bridge 56 for transmission to the information engine 65. If a sensor 55 is unable to transmit to a bridge 56, the sensor 55 may transmit to another sensor 55 in a mesh network for eventual transmission to a bridge 56. In a preferred embodiment, a transmission may be sent from a transmission distance of six sensors 55 from a bridge 56. Alternatively, a transmission is sent from a transmission distance ranging from ten to twenty sensors 55 from a bridge 56. The information engine 65 preferably continuously receives transmissions from the mesh network formed by the sensors 55 via the bridges 56 concerning the movement of persons 58 bearing a near-field communication device 59 and/or devices 100 bearing a tag 60 within the facility 70. The information engine 65 processes the transmissions from the sensors 55 and calculates a real-time position for each of the objects, persons 58 bearing a near-field communication device 59 or objects 100 bearing a tag 60, within the facility 70. The real-time location information for each of the objects is preferably displayed on an image of a floor plan of the facility 70, or if the facility 70 has multiple floors, then on the floor plan images of the floors of the facility 70. The floor plan image may be used with a graphical user interface of a computer, personal digital assistant, or the like so that an individual of the facility 70 is able to quickly locate objects 100 within the facility 70.

As shown in FIG. 1, the system 50 utilizes sensors 55 to monitor and identify the real-time position of individuals bearing or integrated with communication devices 59. The sensors 55a-f preferably wirelessly communicate with each other (shown as double arrow lines) and with an information engine 65 through a wired connection 66 via at least one bridge 56, such as disclosed in the above-mentioned U.S. Pat. No. 7,324,824 for a Plug-In Network Appliance. The near-field communication devices 59 and tags 60 preferably transmit wireless signals 57 which are received by the sensors 55a-e, which then transmit signals to bridges 56 for eventual transmission to the information engine 65. The information engine 65 is preferably located on-site at the facility 70. However, the system 50 may also include an off-site information engine 65, not shown.

In a preferred embodiment, the near-field communication device 59 preferably operates at a short range communication format of magnetic induction, 9 kHz, <125 kHz, 125 kHz RFID, 13.56 MHz, 433 MHz, 433 MHz RFID, and 900 MHz RFID, and preferably at a bit rate of less 256 kilobits per second or approximately 426 kilobits per second. The communication format is preferably IEEE Standard 802.15.4. Further, the near-field communication device 59 also operates using a medium range communication format. The medium range communication format can include ZIGBEE, BLUETOOTH, BLUETOOTH low energy, WiFi, Low-power WiFi, Ultrasound and Infrared communication formats. Those skilled in the pertinent art will recognize that other communication formats may be used with departing from the scope and spirit of the present invention. The medium range communication format also allows the near-field communication device 59 to communicate with the sensors 55 to transmit interaction information.

In a preferred embodiment, each tag 60, or wireless communication device, preferably transmits a radio frequency signal. Each device preferably uses a low-power, medium-range (1 foot to 30 feet) wireless communication system. Such wireless communication systems include ZIGBEE, BLUETOOTH, Low-Power BLUETOOTH, WiFi or Low-Power WiFi, Ultra Wide Band ("UWB"), Ultrasound and Infrared communication systems. A preferred radio-frequency signal is approximately 2.48 GigaHertz ("GHz"). The communication format is preferably IEEE Standard 802.15.4. Those skilled in the pertinent art will recognize that the tags 60 may operate at various frequencies without departing from the scope and spirit of the present invention. The tags 60 may be constructed with an asset theft protection system such as disclosed in Baranowski et al., U.S. Pat. No. 7,443,297 for a Wireless Tracking System And Method With Optical Tag Removal Detection, which is hereby incorporated by reference in its entirety. The tags 60 and near-field communication devices 59 may be designed to avoid multipath errors such as disclosed in Nierenberg et al., U.S. Pat. No. 7,504,928 for a Wireless Tracking System And Method Utilizing Tags With Variable Power Level Transmissions, and Caliri et al., U.S. Patent Publication Number 2008/0012767 for a Wireless Tracking System And Method With Multipath Error Mitigation, both of which are hereby incorporated by reference in their entireties.

A description of sterilizable tags 60 and systems using sterilizable tags is found in Caliri et al., U.S. Pat. No. 7,636,046 for Wireless Tracking System And Method With Extreme Temperature Resistant Tag, which is hereby incorporated by reference in its entirety. Another description of a sterilizable tag 60 and systems using sterilizable tags is found in Perkins et al., U.S. Pat. No. 7,701,334 for Wireless Tracking System And Method For Sterilizable Object, which is hereby incorporated by reference in its entirety. Another description of a sterilizable tag 60 and systems using sterilizable tags is found in Hertlein et al., U.S. patent application Ser. No. 13/371,416, filed on Feb. 11, 2012, for Sterilizable Wireless Tracking And Communication Device And Method For Manufacturing, which is hereby incorporated by reference in its entirety. In another embodiment, the tags 60, or wireless communication devices, are used with or as back-hauling communication devices such as disclosed in Perkins, U.S. Pat. No. 8,040,238 for Wireless Tracking System And Method For Backhaul Of Information, which is hereby incorporated by reference in its entirety.

As shown in FIGS. 2-3, the facility 70 is depicted as a hospital. The facility 70 has multiple floors 75a-c. Each floor 75a, 75b and 75c has multiple rooms 90a-i, with each room 90 accessible through a door 85. Positioned throughout the facility 70 are sensors 55a-o for obtaining readings from communication devices 59 and tags 60 attached to people or objects. A bridge 56 is also shown for receiving transmissions from the sensors 55 for forwarding to the information engine 65. For example, as shown in FIG. 2, the system 50 determines that individuals 58a, 58b and 58c are located in a surgery room and are using device 100c, which is a surgical kit. The information engine 65 analyzes the interaction by monitoring the duration of the interaction, the devices 100 utilized, the location of the interaction (surgery), the previous location of the individuals 58 (possibly a surgical prep room) and additional factors.

In another example, as shown in FIG. 3, individuals 58a, 58b and 58c are located in a patient's room and are using a medical object with an attached tag 60c, which is a patient monitoring unit. In this example, individual 58a is a patient, individual 58b is a physician, and individual 58c is a nurse. The near-field communication device 59 of each individual 58a, 58b and 58c communicates with the other near-field communication devices 59 using a short range communication format as discussed above. In such a situation, each near-field communication device 59 registers the short range beacons transmitted by other near-field communication devices 59. Additionally, interaction information may be transferred between the near-field communication devices 59 using a medium range communication format as discussed above. Further, one, two or all of the near-field communication devices 59 transfer interaction information to at least one sensor 55 using a medium range communication format. The sensor 55 then transmits the interaction information to an information engine 65, preferably using a mesh network. The information engine 65 analyzes the near-field communication interaction information received by the sensor 55 by monitoring the duration of the near-field communication interaction, the objects 100 utilized, the location of the near-field communication interaction (patient's room), the previous location of the individuals 58 and additional factors. The information engine 65 preferably uses this data to generate billing information for the patient.

Figure 4:
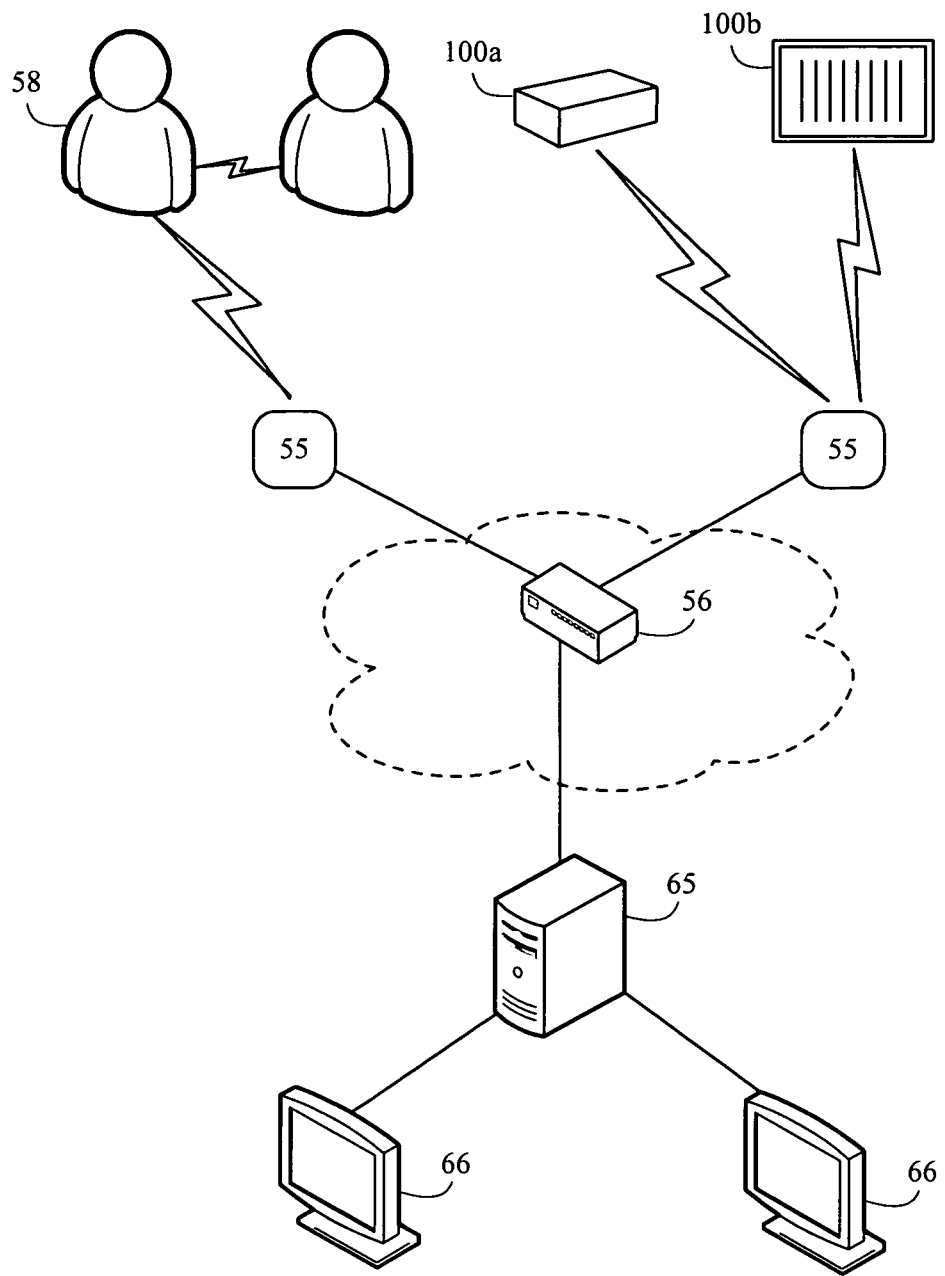
FIG. 4 is a block diagram of a flow of information utilizing a system for analyzing a near-field communication interaction.

FIG. 4 illustrates a preferred architecture of the system 50. For description purposes, the information providers are set forth on one side of the network and the operations is set forth on the other side of the network. However, those skilled in the pertinent art will recognize that the illustrated architecture of the system 50 is not meant to limit any physical relationship between information providers and operations. In fact, an individual 58 could be tracked while accessing information from an object 100 such as a computer 66 in operations. The information providers include individuals 58 that wear near-field communication devices 59, equipment 100a bearing tags 60, sterilizable equipment 100b bearing sterilizable tags 60, and the like. A description of sterilizable tags 60 and system is found in Caliri et al., U.S. Pat. No. 7,636,046 for Wireless Tracking System And Method With Extreme Temperature Resistant Tag, which is hereby incorporated by reference in its entirety. Another description of a sterilizable tag 60 and system is found in Perkins et al., U.S. Pat. No. 7,701,334 for Wireless Tracking System And Method For Steriliz-able Object, which is hereby incorporated by reference in its entirety. A bridge 56 acts as an intermediary between the information providers and operations. The bridge 56 communicates information to the information engine 65 which analyzes the information to determine an interaction information between individuals for access through an enterprise local area network for display on computers 66 or other graphical user interface devices.

Figure 5:
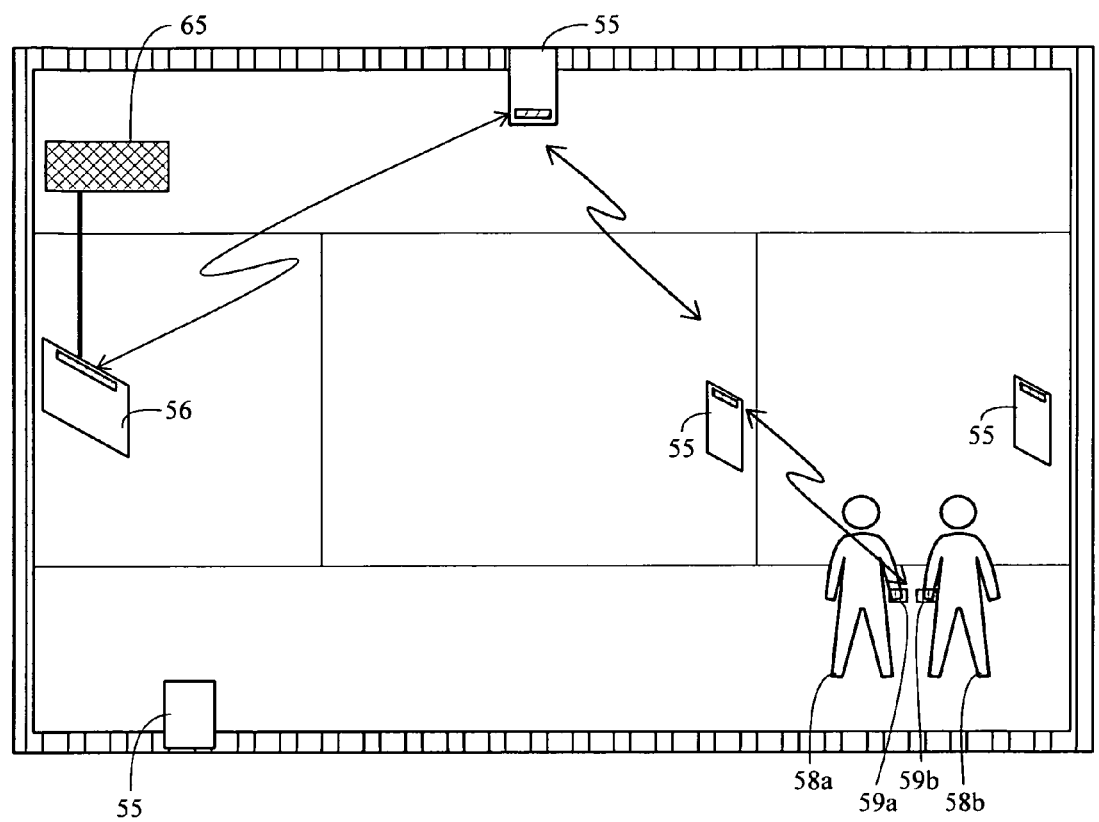
FIG. 5 is a block diagram of a flow of information utilizing a system for analyzing a near-field communication interaction.

A block diagram of a system utilizing near-field communication is illustrated in FIG. 5. In FIG. 5, two individuals 58a and 58b are in proximity in order to "mash-up" and have a valid near-field communication interaction with each individual's near-field communication devices 59a and 59b using a short range communication format as discussed above. A signal is transmitted from one of the individuals 58a near communication device 59a to a sensor 55 of a mesh network utilizing a medium range communication format as discussed above. The signal contains information pertaining to the near-field communication interaction. The sensor 55 transmits the signal through the mesh network to a bridge 56 for further transmission to an information processing engine 65.

Figure 5C:
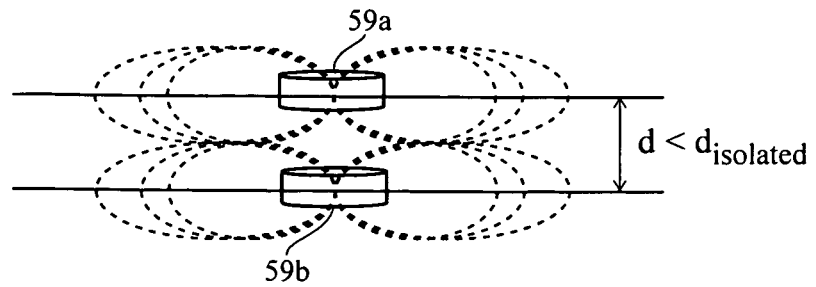
FIG. 5C is an illustration of a valid near-field link between near-field communication devices.
Figure 5B:
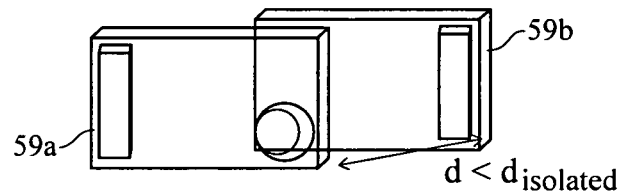
FIG. 5B is an illustration of a valid near-field link between near-field communication devices.
Figure 5A:
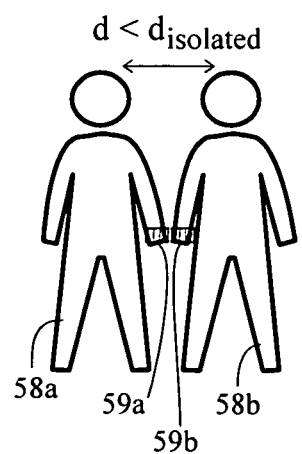
FIG. 5A is an illustration of a valid near-field link between near-field communication devices.

FIGS. 5A, 5B and 5C illustrate a valid near field communication link which occurs when the two near-field communication devices 59a and 59b are within a predetermined distance of each other (d<d isolated). Preferably the distance is one meter or less, and most preferably the distance is ten centimeters or less. Most preferably there is a physical touch between the two near field communication devices. Requiring such proximity allows for power savings since the transmission field for each of the near field communication devices 59a and 59b is a minimal amount. If the near field communication device 59 were to transmit using a typical RFID signal or BLUETOOTH signal, then the power consumption would be greater. Those skilled in the art will recognize that the tag 60 and near field communication device 59 may be the same physical device with circuitry for both applications.

Figure 6B:
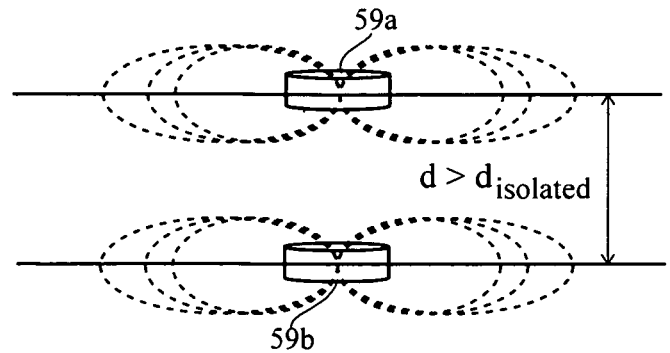
FIG. 6B is an illustration of a failed near-field link between near-field communication devices due to a distance between near-field communication devices.
Figure 6A:
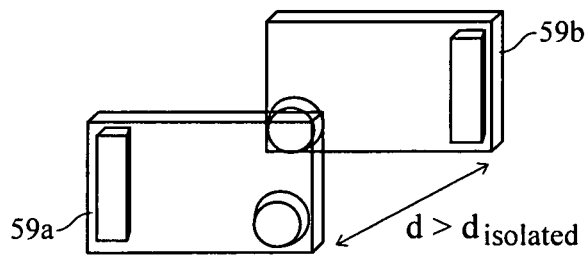
FIG. 6A is an illustration of a failed near-field link between near-field communication devices due to a distance between near-field communication devices.
Figure 6:
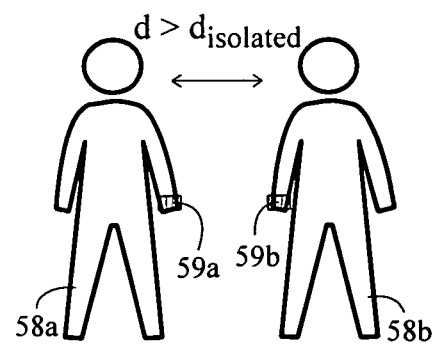
FIG. 6 is an illustration of a failed near-field link between near-field communication devices due to a distance between near-field communication devices.

FIGS. 6, 6A and 6B illustrate an unsuccessful near-filed communication link. In this situation, the two near-field communication devices 59a and 59b are not within a predetermined distance of each other (d>d isolated). Preferably, the distance is more than one meter and most preferably the distance is more than ten centimeters. In such a situation, there is no near field communication interaction. Thus, even though the near-field communication devices 59a and 59b are transmitting signal beacons, the individuals 58a and 58b are too far apart to detect a beacon signal from the other near-field communication device 59.

Figure 7:
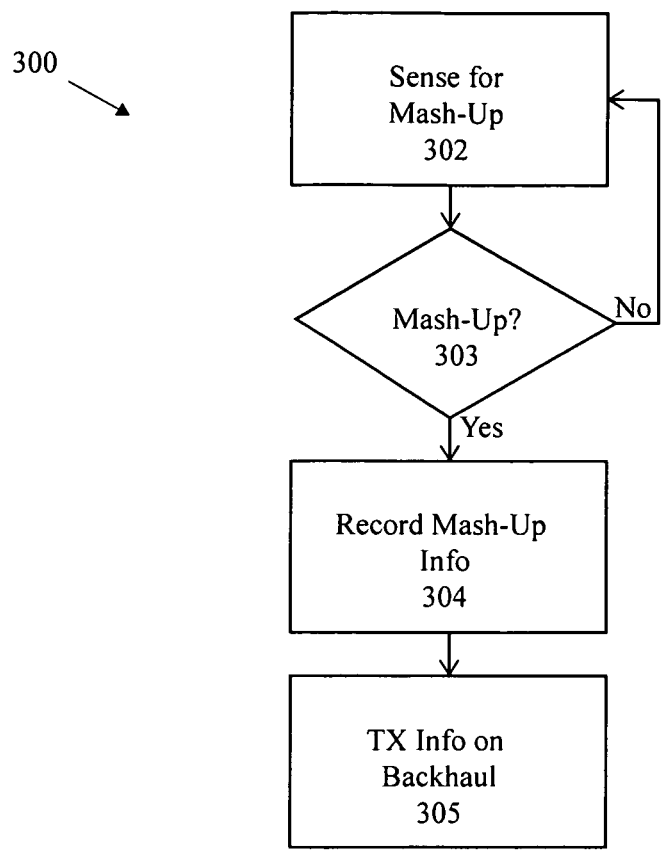
FIG. 7 is a flow chart of a method for analyzing a near-field communication interaction.

A method 300 utilizing near field communication is shown in FIG. 7. At block 302, a sensor 55 senses for a near field communication interaction ("mash-up") between at least two near-field communication devices 59. At a decision block 303, if no near field communication interaction is detected, then the sensor 55 continues to search for a near field communication interaction at block 302. However, if a near field communication interaction is detected by the sensor 55 at decision block 303, the near field communication interaction is recorded at block 304. Next, at block 305, data for the near field communication interaction is transmitted over the mesh network.

The near-field communication device 59 preferably includes a microcontroller, a first transceiver for transmitting at the short range communication format, a second transceiver for transmitting at the medium range communication format, a memory, and a power supply. The transmissions are transmitted through the transceivers. The power supply provides power to the components of the near-field communication device 59. All of the components are preferably contained within a housing. A tag 60 preferably has the same components and structure of the near-field communication device 59 except the tag 60 preferably only operates using the medium range communication format.

Figure 8:
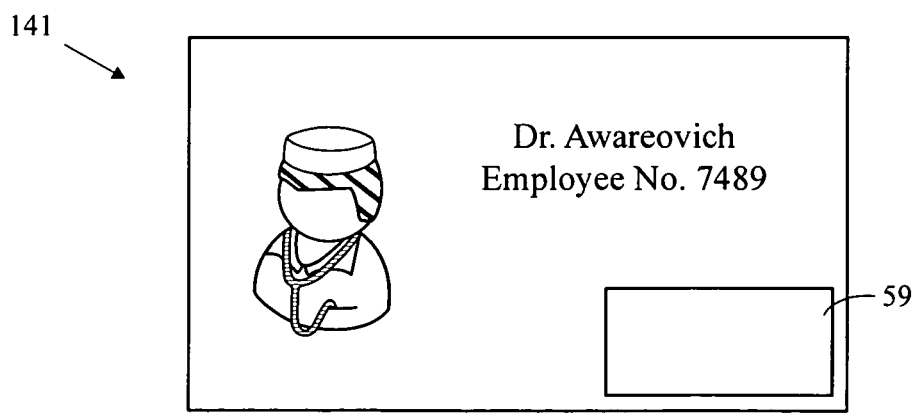
FIG. 8 is a plan view of an identification badge containing a communication device.

As shown in FIG. 8, an identification badge 141 is preferably utilized as a support for a near-field communication device 59 for a person 58. Alternatively, the identification badge 141 is the near-field communication device 59.

In one embodiment, the near-field communication interaction is utilized to authenticate a bearer of a near-field communication device 59 for access to at least one of or a combination of a computer, medical equipment, a protected area of the facility, a medication drawer, or a patient's room. For example, an individual 58 bearing the near-field communication device 59 is a physician and the physician 58 is granted access to a patient's room through a near-field communication interaction with a near-field communication device 59 on a door of the patient's room. In one example, the patient has a highly contagious disease and the tracking of access to the patient's room allows a hospital to know who has been exposed to the patient.

In another embodiment, the near-field communication interaction is utilized to track proper hand washing at a hospital. In this example, a near-field device 59 is positioned near a hand washing station for sterilizing hospital personal prior to surgery or similar procedures that require sterilization. When a bearer of a near field device 59 sterilizes his/her hands at the station, an Infrared detector of the hand washing station activates the hand washing station and a near-field interaction of the near-field devices 59 is recorded and transmitted to a sensor 55 for transmission and recordation at an information engine 65. In this manner, the hospital has a record to demonstrate that proper sterilization was performed prior to surgery or similar procedure requiring sterilization.

In a preferred embodiment, the interaction of near-field communication devices 59a and 59b results in a short range communication transceiver of one of the near-field communication devices 59 transmitting a command to the processor of the near-field communication device 59 that an interaction has occurred between near-field communication devices 59. The processor sends the data from the interaction to a medium range communication transceiver of the near-field communication device 59, which transmits the data to a sensor 55 of the mesh network. The sensor 55 preferably transmits the signal through the mesh network to a bridge 56 for further transmission to an information processing engine 65.

In another embodiment, a first near-field communication device 59a has control over a second near-field communication device 59b. In this embodiment, the second near-field communication device 59b has a temperature sensor which triggers an alarm when a threshold temperature is detected by the sensor. When the alarm of the second near-field communication device 59b is activated, only a near-field interaction with the first near-field communication device 59a deactivates the alarm. Specifically, the second near-field communication device 59b receives a short range communication transmission from the first near-field communication device 59a with an identification of the first near-field communication device 59a in the transmission which results in the deactivation of the alarm of the second near-field communication device 59b.

In another embodiment, a first near-field communication device 59a has control over a second near-field communication device 59b, which permits access to a secure location. In this embodiment, the second near-field communication device 59b deactivates a lock to a secure location and transmits a signal along a mesh network that the lock has been deactivated. A near-field interaction with the first near-field communication device 59a deactivates the lock. Specifically, the second near-field communication device 59b receives a short range communication transmission from the first near-field communication device 59a with an identification of the first near-field communication device 59a in the transmission which results in the deactivation of the lock controlled by the second near-field communication device 59b.

In yet another embodiment, a near-field interaction between a first near-field communication device 59a and a second near-field communication device 59b triggers an alarm to page security. Specifically, the second near-field communication device 59b receives a short range communication transmission from the first near-field communication device 59a with an identification of the first near-field communication device 59a in the transmission which results in the second near-field communication device 59b transmitting a medium range communication transmission to a sensor 55 of a mesh network to transmit the signal to a server to issue a page to security.

Figure 9:
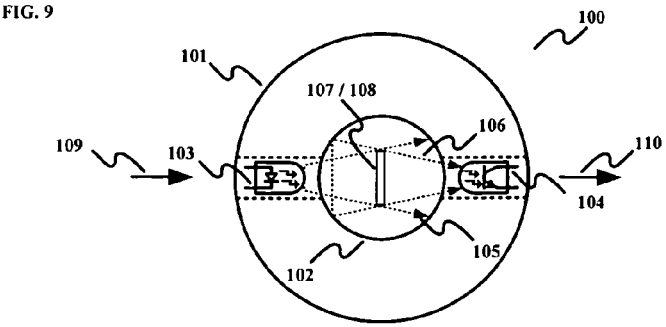
FIG. 9 illustrates a detector module.

A detector module 100 comprising a detector body 101 with an object detection window 102, a light emitter 103 and a light detector 104 is shown in FIG. 9. For the exemplary embodiment of this invention, the emitter 103 is an LED that produces a light output 105 proportional to a current input 109 and the detector 104 is a photo-transistor that produces a current output 110 proportional to a light input 106. The output beam 105 produced by the emitter 103 is, in the absence of a blocking object 108, sensed within an area of overlap 107, the "Detection window", between the output beam and the sensing beam 106 by the detector that produces a current output 110. When the blocking object 108 blocks any portion of the area of overlap between beams 105 and 106, the detectors input beam is diminished that in turn results in a reduction of the detection current 110.

For the exemplary embodiment of this invention the blocking object will be a liquid dispensed from a dispensing device but may be any material that may pass through the detection window.

Although shown as a torroidial shape, the detector module 100 may be of any shape that suitably positions the emitter and detector such that the blocking object which is to be detected may pass through the detection window such that it blocks a sufficient quantity of light in the detection window to produce a desired level of current change between the unblocked and blocked states.

Figure 10:
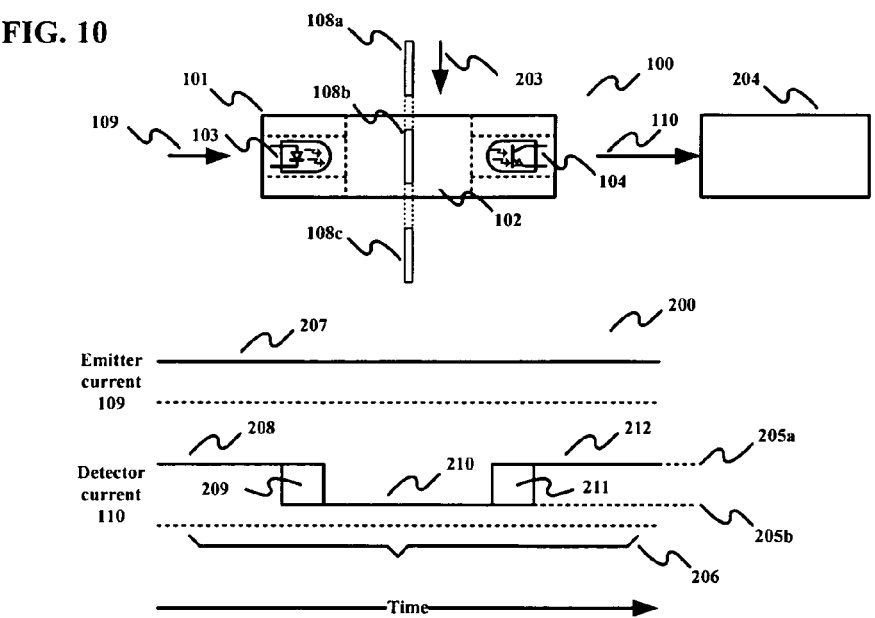
FIG. 10 illustrates an exemplary detector module in a side view and a graphical representation of a detection cycle.

FIG. 10 shows the exemplary detector module 100 in a side view and a graphical representation 200 of a detection cycle 206. During the detection cycle for this example, the emitter current 109 is constant with respect to time and a blocking object 108 passes through the detection window in a direction 203 starting in position 108a, passing in the detection window as position 108b and exits the window at position 108c. A signal processing device 204 is connected to the detector current 109 such that a certain level 205a is detected as an "Open window" condition and a level 205b is detected as a "Blocked window" condition. When the object is at position 108a no light from emitter 103 is blocked resulting in a maximum detector current 205a at time 208 that the signal processor interprets as no object present in the sensing window 102. At position 108b, some portion of the light from the emitter is blocked resulting in a reduced detector current 205b at time 210 that the signal processor interprets as an object in the sensing window. As the object passes through the sensing window and reaches position 108c, just as with position 108a no light is blocked resulting in the current 205a and the completion of the sensing cycle 206 as the signal processor determines that again no object is present in the window.

At times 209 and 211, where the blocking object is between positions 108a and 108b and positions 108b and 108c respectively, an uncertainty may be present in the signal processor as to the actual position of the blocking object 108. This uncertainty and a method for handling it will be discussed at a later time.

Figure 11:
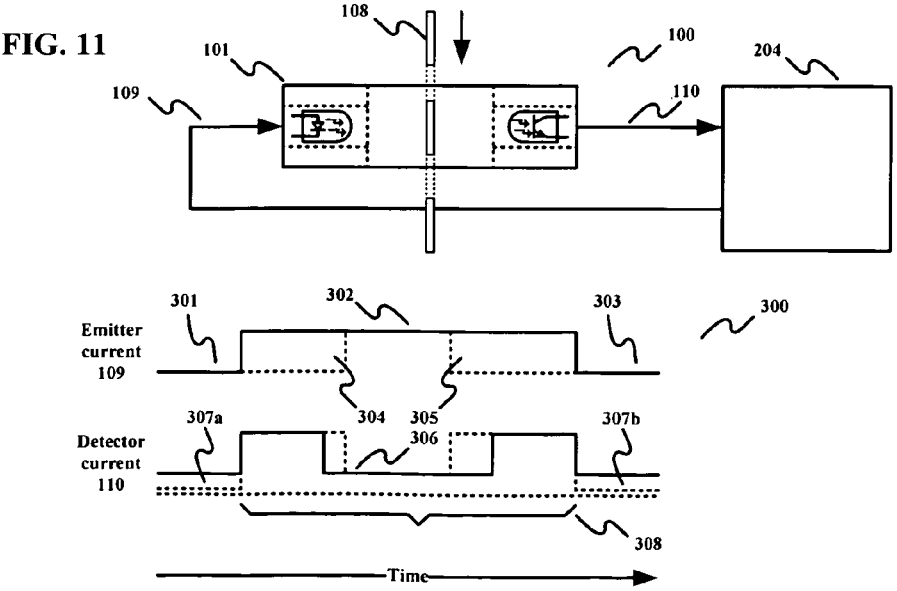
FIG. 11 illustrates an alternative detector module in a side view and a graphical representation of a modified detection cycle within a timing diagram utilized to reduce the amount of power consumed by the detector module and signal processor.

Referring to FIG. 11, a modified detection cycle 305 shown graphically within timing diagram 300 may be utilized to reduce the amount of power consumed by the detector module 100 and signal processor 204. In order to control the emitter current 109, a connection is made from the signal processor such that the emitter may be turned on or off. A new reduced power detection cycle 308 is established such that emitter current 109 is established only during time 302, and removed at all other times 301 and 303, before and after the detection cycle respectively. The time 302 may be reduced by an amount 304 and or 305 such that the remaining active time of time 302 coincides with the transit of the blocking object 108 within the detection window, corresponding to a possible stable detector current period 306. A further reduction is power consumption 307a and 307b may be realized by controlling detector current 110 during periods 301 and 303 which may result as a function of an ambient light source or leakage in the detector 104.

Figure 12:
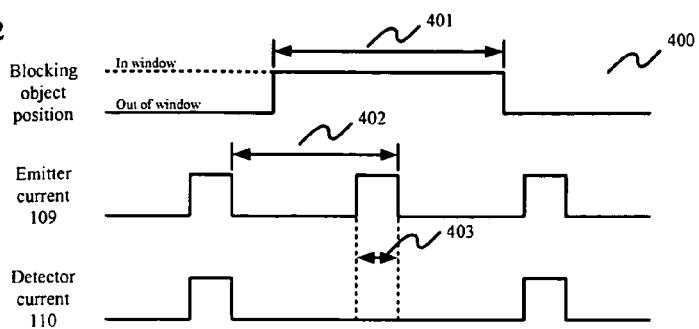
FIG. 12 illustrates a sampling regimen.

Referring to FIG. 12, a sampling regimen 400 is shown where a minimum periodicity of detection samples 402 may be utilized such that a minimum time 401 in which the blocking object is within the detection window corresponds to at least one detection event 403.

Figure 13:
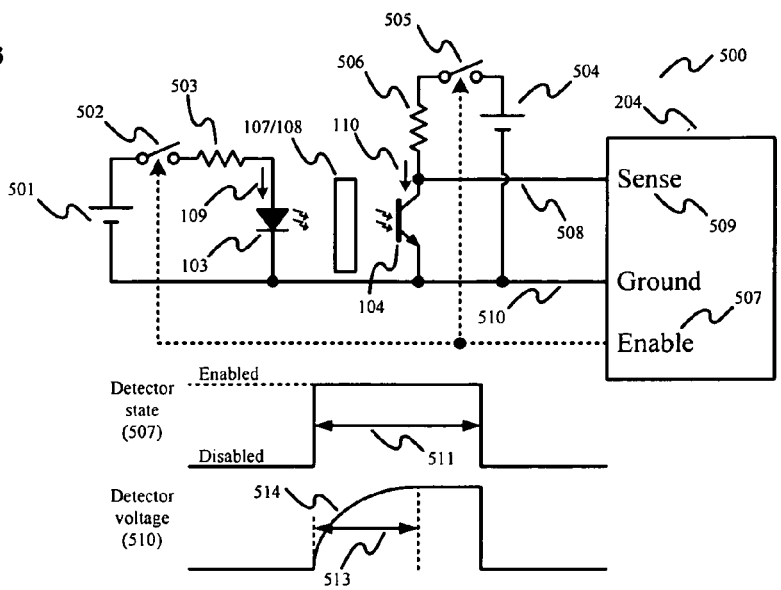
FIG. 13 illustrates a preferred embodiment of a detection system.

Referring to FIG. 13, one exemplary embodiment of a detection system 500 is shown. The emitter 103 is connected to a controllable current source comprising a power source 501, a control switch 502 and a current limiting resistor 503. An emitter enable signal 507 is made at the signal processor 204 such that the current 109 may be turned on or off via the control switch 502. The detector 104 is connected to a controllable current source comprising a power source 504, a control switch 505 and a current to voltage converting resistor 506. The emitter enable signal 507 is also connected to the detector control switch such that the entire detector 500 may be operated, although these two signals may be controlled independently as will be discussed later.

The resistor 506 converts the detector current 110 into a voltage 508 that may be conveniently analyzed by a sense input 509 of the signal processor 204. In the exemplary embodiment, the sense input 509 is an input to an analog to digital converter within the signal processor however another embodiment may use a simple digital input where the analog detection levels from the detector are interpreted directly as zeros and ones, familiar to those practiced in the art. For this example, a reference ground 510 is established as zero volts where the detector output voltage will range from zero to some positive fraction of power source 504 for a zero to a maximum current through resistor 506 respectively corresponding to a maximally blocked to a minimally blocked detector window 108 respectively.

A minimum detection period 513 is defined as an amount of time from the beginning of a detection period 511 after which a stable signal 512 is available for interpretation by the signal processor that is representative of the true condition of the detection window, i.e. open or blocked, that may then be used be the signal processor for arriving at a detection decision. For the exemplary embodiment, the emitter 103 operates at speeds such that it contributes negligible time to the achievement of a stable signal 512 and so will not be discussed further, however where a photo-transistor is used for detector 104, a rise time 514 due to a charge stored in the detector transistor base junction will add significant delay and must be discharged before the stable signal 512 can be achieved, thus limiting the minimum average sensing current of the detector system. The base charge rise time 514 may be reduced by increasing the current 110 by reducing the value of resistor 506 but only at the expense of limiting the dynamic output range of voltage signal 508 making an open versus blocked sensor window determination more difficult. Alternatively, to shorten the rise time 514, a photo-transistor with a base connection such that base charge may be directly controlled by the signal processor may be utilized or a photo-diode which does not have a charge storage mechanism may be used as it has operates on light induced reversed leakage current and not transistor gain. Although these are all valid solutions to the sensor stability delay, these methods incur a decreased sensitivity penalty for the first example or in the case of the last two examples an increase in system cost due to increased device complexity: In the case of the base-available photo transistor the added pin results in a more expensive component and complicates the sensor connection and in the case of the photo-diode its intrinsic speed advantage over a photo-transistor comes at the cost of more semiconductor surface area than a comparably performing photo-transistor, which translates to a more expensive device, as it has no gain mechanism.

Figure 14:
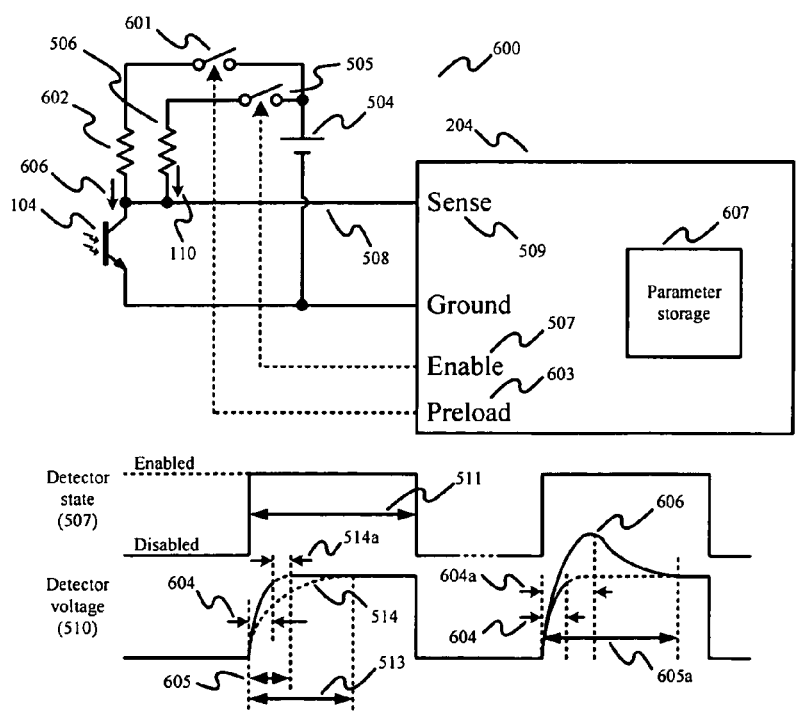
FIG. 14 illustrates an alternative embodiment of a detection system.

FIG. 14 illustrates a detection system 600 whereby a low cost two pin photo-transistor can be made to operate much faster than in the connection shown in FIG. 13. A preload control signal 603 is connected from the signal processor 204 to a preload control switch 601 that connects detector current source 504 to a preload resistor 602. The preload resistor is selected such that its current is much higher than the detector current to voltage converter resistor 506. The preload signal is switched on to allow a preload current 606 to flow, discharging the detector 104 current in a period 604 that is shorter than the original period 514 due to the increased current. The preload signal is then switched off after which the enable signal 507 is switched on resulting in a shorter rise 514a to stability as most of the base charge has been depleted. The sample period 511 may now be reduced to match a now shorter time to stability 605. Alternatively, the preload and enable signals may be used in parallel where the preload signal is set to off at the end of period 604. The preload time 604 may be determined empirically to prevent an overshoot signal 606 as a function of transistor saturation that would result in an extended recovery time 604a and an increased time to stability 605a. For maximum system configurability, all of the aforementioned timing parameters may be dynamically adjustable and stored in a non-volatile parameter storage memory 607 within or without the signal processor 204.

Figure 15:
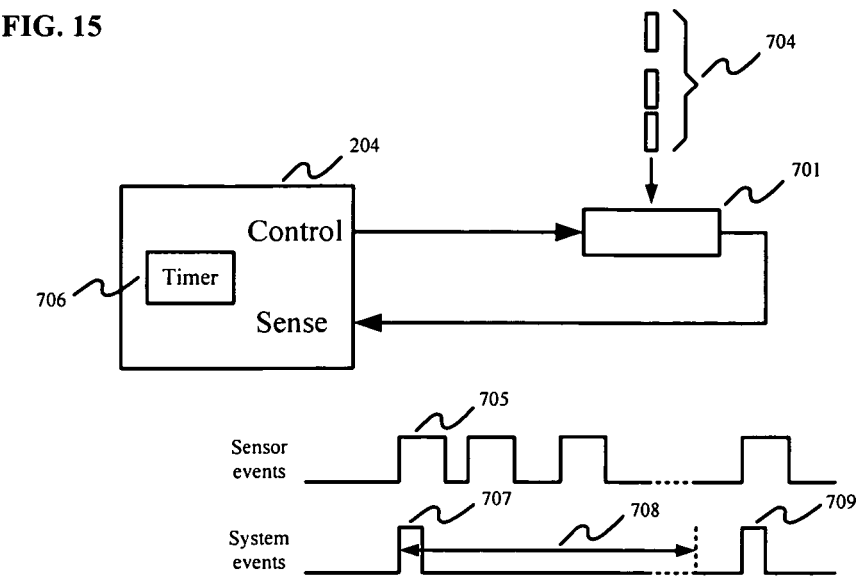
FIG. 15 illustrates a method by which an event that comprises several separate events spaced closely in time is treated as a single event.

FIG. 15 illustrates a method by which an event 704 that may comprise several separate events spaced closely in time can be treated as a single event. At a time of a first event 705 detected with a sensor system 701 the signal processor 204 registers a first event 707 and then starts a timer 706 set to count down a new-event lock-out delay 708. Any events within the lock-out period are simply ignored, or for even lower power consumption the sensor system 701 can simply remain idle during the lock-out period. After the lock-out period, the sensor is once again periodically sampled for new events.

Figure 16:
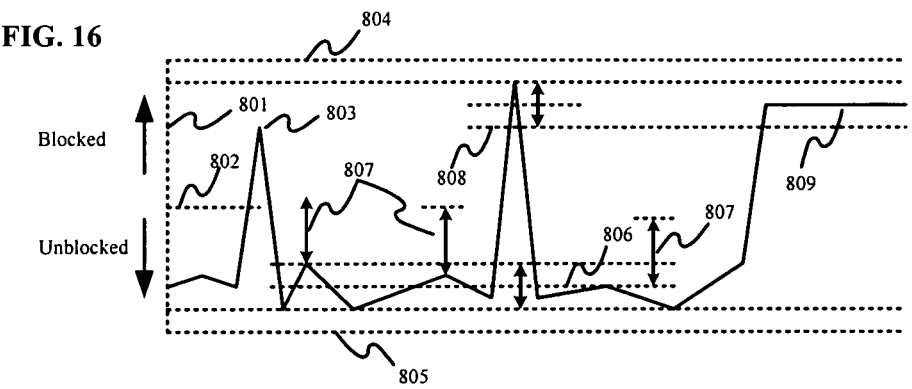
FIG. 16 illustrates a method whereby a sensor is periodically calibrated by a signal processor.

FIG. 16 illustrates a method whereby the sensor 701 can be periodically calibrated by the signal processor so that variations over time and environmentally induced variations of the sensor operating parameters and an external optical environment do not degrade event detection performance. At an initial time 801 an arbitrary event detection threshold 802 is established, above which an event 803 will be considered to have occurred. Additionally, an upper limit 804 and a lower limit 805 are established to indicate a sensor failure. As the system operates, a record of historic levels of idle operation will result in an average low limit 806, i.e. no detection. An event will not be registered unless a minimum change 807 in sensor level above the last reading has occurred. A historic detection threshold average 808 is similarly established to allow detection of a situation 809 comprising a number of sequential lock-outs with an immediate detection where the sensor can be considered blocked and may request cleaning service. For maximum system configurability, all of the aforementioned limit parameters may be dynamically adjustable and stored in a non-volatile parameter storage memory 607 within or without the signal processor 204.

From the foregoing it is believed that those skilled in the pertinent art will recognize the meritorious advancement of this invention and will readily understand that while the present invention has been described in association with a preferred embodiment thereof, and other embodiments illustrated in the accompanying drawings, numerous changes modification and substitutions of equivalents may be made therein without departing from the spirit and scope of this invention which is intended to be unlimited by the foregoing except as may appear in the following appended claim. Therefore, the embodiments of the invention in which an exclusive property or privilege is claimed are defined in the following appended claims.

We claim as our invention the following:

1. A system utilizing near-field communications for monitoring hand sterilization, the system comprising:
   a plurality of sensors located in a facility;
   a plurality of near-field communication devices, each of the plurality of near-field communication devices transmitting a beacon signal using a short range communication format receivable by another near-field communication device when the near-field communication devices are within a predetermined distance of each other, and each of the plurality of near-field communication devices transmitting interaction data using a medium range communication format to at least one of the plurality of sensors;
   a hand sterilization station comprising a hand washing facet activated by an infrared sensor and in communication with a near-field communication device using the short range communication format; and
   an information engine in communication with the plurality of sensors, the information engine processing the interaction data;
   wherein a near-field communication interaction is recorded at the near-field communication device when a bearer of a near field communication device of the plurality of near-field communication devices activates the infrared sensor of the hand washing facet during a hand washing event, the recordation of the near-field communication interaction is transmitted to at least one of the plurality of sensors utilizing the medium range communication format and then transmitted to the information engine for storage.

2. The system according to claim 1 wherein the medium range communication format comprises ZIGBEE, Bluetooth, Low-Power BlueTooth, WiFi or Low-Power WiFi, Ultra Wide Band ("UWB"), Ultrasound or Infrared communication system, and the short range communication format comprises magnetic induction, 9 kHz, <125 kHz, 125 kHz RFID, 13.56 MHz, 433 MHz, 433 MHz RFID, or 900 MHz RFID.

3. The system according to claim 1 wherein the predetermined distance is less than ten centimeters.

4. The system according to claim 1 wherein the interaction data comprises a previous location of a first bearer of a near-field communication device, a previous location of a second bearer of a near-field communication and a number of other objects located near the interaction.

5. The system according to claim 1 wherein the short range communication format comprises magnetic induction, 9 kHz, <125 kHz, 125 kHz RFID, 13.56 MHz, 433 MHz, 433 MHz RFID, 900 MHz RFID, or 2.4 GHz.

6. A method for monitoring hand sterilization utilizing near-field communications, the method comprising:
   sensing for a near-field communication interaction at a hand washing station;
   verifying activation of a infrared sensor for activation of a hand washing facet of the hand washing station;
   verifying a near-field communication interaction with a bearer of a near-field communication device and an activator of the infrared sensor, wherein the near-field communication device and the activator communicate utilizing a short-range communication format;
   recording data concerning the near-field communication interaction at at least one of an interacting near-field communication device; and
   transmitting the data concerning the near-field communication interaction to at least one sensor of a plurality of sensors using a medium range communication format for transmission to a processing engine.

7. The method according to claim 6 wherein near-field communication is transmitted using a short range communication format that comprises magnetic induction, 9 kHz, <125 kHz, 125 kHz RFID, 13.56 MHz, 433 MHz, 433 MHz RFID, or 900 MHz RFID.

8. The method according to claim 6 wherein the near-field communication data is transmitted from the sensor to the information engine using a medium range communication format comprises ZIGBEE, Bluetooth, Low-Power BlueTooth, WiFi or Low-Power WiFi, Ultra Wide Band ("UWB"), Ultrasound or Infrared communication system.

* * * * *